United States Patent
Hill et al.

(10) Patent No.: US 7,239,896 B1
(45) Date of Patent: Jul. 3, 2007

(54) METHOD AND APPARATUS TO IMPROVE CAPACITY AND BATTERY LIFE OF AN AD HOC NETWORK SYSTEM USING SENSOR MANAGEMENT

(75) Inventors: Thomas C. Hill, Crystal Lake, IL (US); Slim Souissi, San Diego, CA (US)

(73) Assignee: Motorola Inc., Schaumburg, IL (US)

( * ) Notice: Subject to any disclaimer, the term of this patent is extended or adjusted under 35 U.S.C. 154(b) by 478 days.

(21) Appl. No.: 09/629,321

(22) Filed: Jul. 31, 2000

(51) Int. Cl.
*H04B 1/38* (2006.01)

(52) U.S. Cl. ............... 455/574; 455/67.11; 455/408; 455/343.1

(58) Field of Classification Search ............... 455/68, 455/69, 88, 355, 507, 524, 574, 522, 343.2, 455/343.3, 343.1, 41.2, 41.3, 63.1, 67.11, 455/67.13, 456.1, 456.3, 455.6, 66.1, 90.1, 455/550.1, 344, 90.2, 40; 370/338; 379/413, 379/433
See application file for complete search history.

(56) References Cited

U.S. PATENT DOCUMENTS

| | | | |
|---|---|---|---|
| 5,134,708 A * | 7/1992 | Marui et al. ............... 455/421 |
| 5,586,182 A * | 12/1996 | Miyashita ................... 379/413 |
| 5,594,951 A * | 1/1997 | Bellin ......................... 455/574 |
| 5,953,677 A * | 9/1999 | Sato ............................ 455/574 |
| 6,067,460 A * | 5/2000 | Alanara et al. ............. 455/574 |
| 6,078,826 A * | 6/2000 | Croft et al. ................. 455/574 |
| 6,085,090 A * | 7/2000 | Yee et al. .................... 455/440 |
| 6,195,572 B1 * | 2/2001 | Patterson et al. ........... 455/570 |
| 6,219,540 B1 * | 4/2001 | Besharat et al. ............ 455/421 |
| 6,317,587 B1 * | 11/2001 | Tiedemann, Jr. et al. ..... 455/69 |
| 6,339,713 B1 * | 1/2002 | Hansson et al. ............ 455/574 |
| 6,374,079 B1 * | 4/2002 | Hsu ........................ 455/11.1 |
| 6,408,187 B1 * | 6/2002 | Merriam ..................... 455/458 |
| 6,408,196 B2 * | 6/2002 | Sheynblat et al. .......... 455/574 |
| 6,532,368 B1 * | 3/2003 | Hild et al. .................. 455/515 |
| 7,016,705 B2 * | 3/2006 | Bahl et al. .................. 455/566 |
| 7,031,663 B2 * | 4/2006 | Heinonen et al. ........ 455/67.11 |
| 2001/0031633 A1 * | 10/2001 | Tuomela et al. ............ 455/417 |
| 2001/0033556 A1 * | 10/2001 | Krishnamurthy et al. ... 370/329 |
| 2002/0021278 A1 * | 2/2002 | Hinckley et al. ........... 345/156 |
| 2003/0060212 A1 * | 3/2003 | Thomas ..................... 455/456 |
| 2003/0119568 A1 * | 6/2003 | Menard ..................... 455/572 |
| 2005/0003793 A1 * | 1/2005 | Goris et al. ................ 455/347 |
| 2005/0046584 A1 * | 3/2005 | Breed .................... 340/825.72 |

\* cited by examiner

*Primary Examiner*—Edward F. Urban
*Assistant Examiner*—Blane J. Jackson
(74) *Attorney, Agent, or Firm*—Hisashi D. Watanabe

(57) ABSTRACT

A network having at least one communication device having at least one sensor to process and manage sensor added information to adjust the state of the communication device or to adjust capacity limitations of the network. The sensor added information can be shared with other communication devices in the network to improve network capacity and add master devices to the network if needed to maximize the quality and efficiency of communications within the network.

1 Claim, 3 Drawing Sheets

METHOD AND APPARATUS TO IMPROVE CAPACITY AND BATTERY LIFE OF AN AD HOC NETWORK SYSTEM USING SENSOR MANAGEMENT

FIELD OF THE INVENTION

The present invention relates to utilizing surrounding information to improve battery life and system capacity of a wireless communication device in a wireless network while maintaining an ad hoc nature of the wireless network.

BACKGROUND OF THE INVENTION

Short range wireless networks, such as Bluetooth, suffer from battery life and capacity limitations due to the ad hoc nature of Bluetooth networks. To centralize the network to improve these conditions would defeat the ad hoc nature of the short range system. Therefore, a method to utilize surrounding information to improve battery life and system (network) capacity, while maintaining the ad hoc nature of the wireless network, is needed.

Sensors are becoming more miniature and will be ubiquitous on people and inside objects over the coming years. The number and type of sensors available is expected to be very large. For example, there will be sensors for sound, video, direction, gyro, etc. The ubiquity of miniaturized sensors in conjunction with short range wireless networks will provide multiple personalized and customized capabilities for the consumer. In addition, these new combinations of sensors, sensor processing, sensor management and short range wireless networks, such as Bluetooth, can be used to improve on the ad hoc nature of the short range wireless network.

Thus, it is desirable to provide a method of using sensors, coupled with short range wireless networks, to improve battery life of wireless communication devices in a wireless network and the system capacity of the wireless network.

BRIEF DESCRIPTION OF THE DRAWINGS

The features of the present invention that are believed to be novel are set forth with particularity in the appended claims. However, the invention together with further advantages thereof, may be best understood by reference to the accompanying drawings wherein:

DETAILED DESCRIPTION OF THE PREFERRED EMBODIMENT

Figure 1:
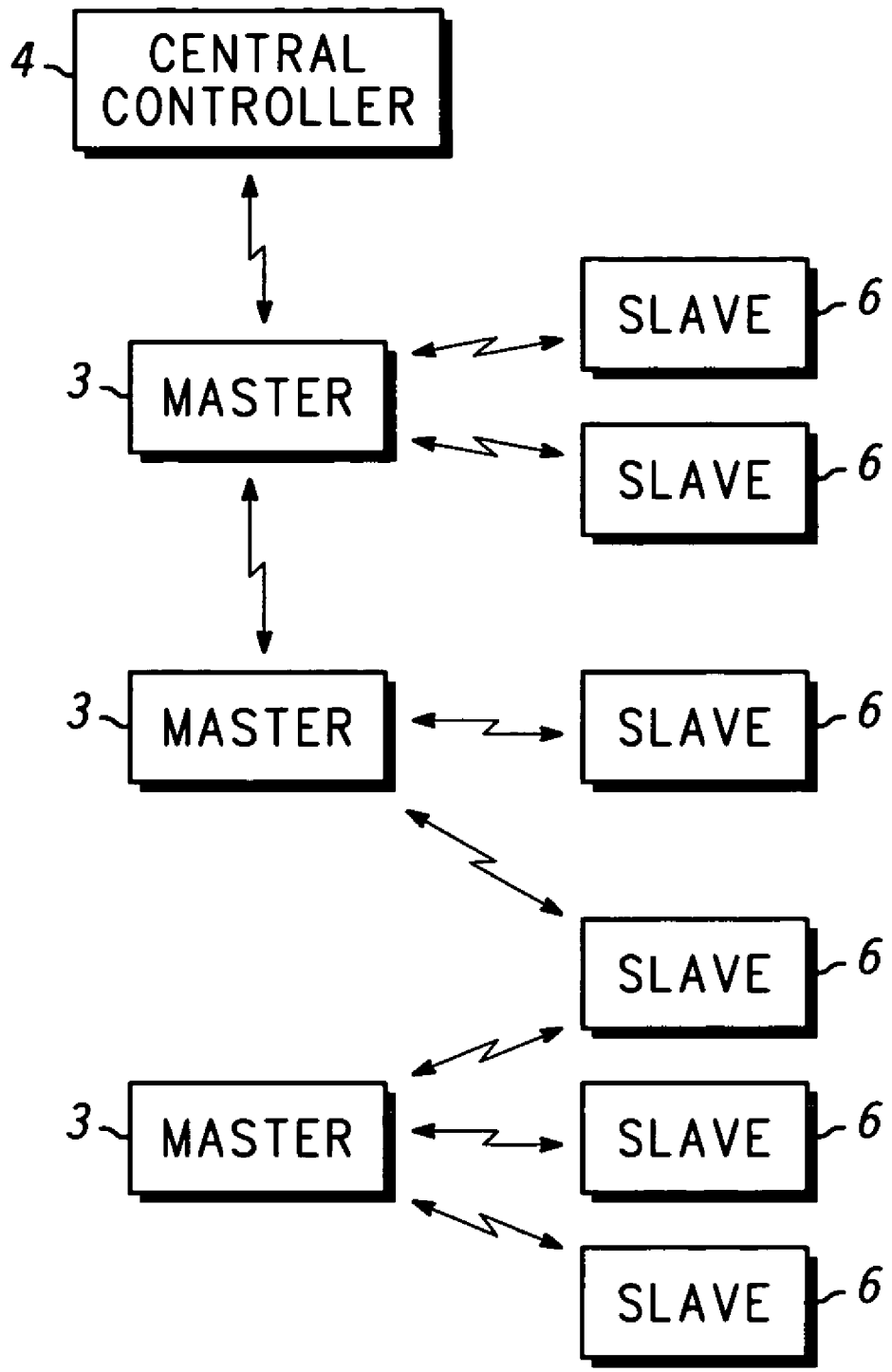
FIG. 1 is a diagram showing a wireless network according to the present invention.

FIG. 1 is a diagram showing a wireless network according to the present invention. Referring to FIG. 1, wireless network 2 is preferably an Ad Hoc network, such as Bluetooth. The Bluetooth network depicted in FIG. 1 is often referred to as a scatternet type of network operation. It is possible that the network could be a piconet type network with a single slave or a multiple slave operation.

Within wireless network 2, there is at least one master device 3, which is preferably capable of initiating an action or requesting a service within wireless network 2. Master devices 3 control communications between themselves and slave devices 6. Each master device 3 is capable of communicating with slave devices 6 and each slave device 6 is capable of communicating with another slave device 6 through master devices 3. This is known as peer-to-peer communication.

Master devices 3 and slave devices 6 are preferably short-range wireless communication devices, such as personal digital assistants, cellular phones, digital wallets, etc. Master devices 3 and slave devices 6 need not necessarily be the same type of device, i.e., personal digital assistants, as long as they are all Bluetooth enabled devices. These communication devices could also be wire-line communication devices according to an embodiment of the present invention.

As seen in FIG. 1, optionally a central controller 4 may be included in wireless network 2. Central controller 4 is preferably capable of communicating with a master device 3, as shown in FIG. 1, and may serve to centralize wireless network 2 and allocate bandwidth amongst the various communication devices within wireless network 2. Central controller 4 is a fixed piece of equipment such as a personal computer having the hardware and software necessary to control wireless network 2. The structure of central controller 4 is well known in the art and, thus, a detailed explanation will be omitted herein.

Figure 2A:
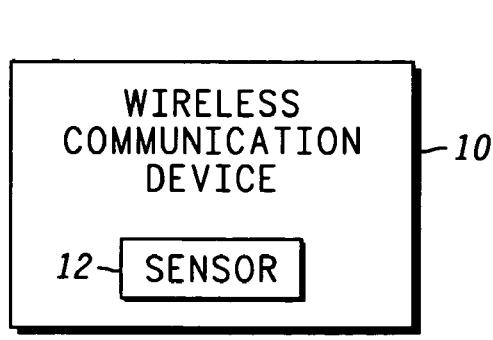
FIG. 2A is a diagram showing a wireless communication device incorporating a sensor according to the present invention.

FIG. 2A is a diagram showing a wireless communication device which incorporates a sensor according to the present invention. The wireless communication device may be a master device or a slave device. Referring to FIG. 2A, wireless communication device 10 may contain a sensor 12 or a plurality of sensors, each having a different function. Sensor 12 may be a motion sensor, a light sensor, a crowd sensor, a range sensor, an inertial sensor, an accelerometer sensor on a sound sensor or any other type sensor which measures conditions around itself. The information collected by sensor 12 is preferably processed by wireless communication device 10. Such a processor is well known in the art and, thus, a detailed description of its structure will be omitted.

If more than one sensor 12 is incorporated within wireless communication device 10, all sensor information can be combined and processed by wireless communication device 10. Wireless communication device 10 may have a display (not shown) which may enable a user of the device to select different sensor options or manipulate the operation of wireless communication device 10. According to an embodiment, wireless communication device 10, which incorporates sensor 12, may be a device having only the necessary structure to take sensor measurements and transmit such measurements to another device, such as a slave device 6 or a master device 3, which are depicted in FIG. 1.

As an example of an embodiment of the present invention, sensor 12 can be a motion sensor which may be used to place wireless communication device 10, or any other device, such as master device 3 or slave device 6, into a stand-by mode. Stand-by mode can have any power configuration which would allow the respective device to reduce its power consumption by supplying power to only those systems which are necessary to receive an initial communication, such as receiving a page notification, for example. Such a stand-by mode is intended to save battery power of its respective device. If the motion sensor detects that wireless communication device is moving, it may place the device into stand-by mode based on the assumption that a communication operation is currently underway, for example.

Sensor 12 also may be capable of determining a position or orientation of wireless communication device 10. In this case, typically, if it is determined by sensor 12 that wireless communication device 10 is in an active position, perhaps horizontal with respect to earth, which would be predefined according to the type of device, i.e., cellular telephone, pager, PDA, etc., wireless communication device 10 would use this sensor added information, once processed by wireless communication device 10, to change the power status from stand-by status to an active status. However, if sensor 12 detects that wireless communication device 10 is in an inactive position, perhaps attached to the user's belt and in a vertical position with respect to earth, for example, this sensor added information could be used by wireless communication device 10 to place the device into stand-by mode, thus reducing the overall power consumption of the device.

Figure 2B:
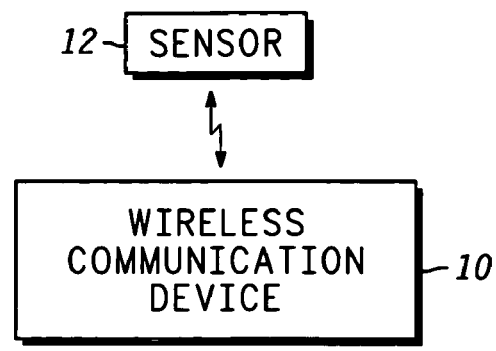
FIG. 2B is a diagram showing a wireless communication device and a separate sensor according to the present invention.

FIG. 2B is a diagram showing a wireless communication device which has no integrated sensor according to the present invention. Referring to FIG. 2B, sensor 12 may be a stand-alone sensor or may be integrated into another wireless communication device 10, as shown in FIG. 2A, which may be a master 3 or a slave 6 (see FIG. 1). It is possible that sensor 12 is a fixed sensor or a mobile sensor, perhaps embedded within a wall or a diaper, for example, and has the capability to transmit the sensed information to wireless communication device 10, which again could be a master device 3 or a slave device 6, or to central controller 4. According to this embodiment, sensor 12 is preferably capable of wirelessly communicating with a communication device, such as wireless communication device 10, for example. This could be accomplished by coupling sensor 12 to a Bluetooth enabled device (not shown), which would enable sensor 12 to communicate sensor information to other devices.

According to this embodiment, for example, sensor 12 could be a moisture sensor, perhaps located in a diaper, which upon detecting a predetermined moisture threshold, would output a trigger to the Bluetooth enabled device. In this case, for example, the Bluetooth enabled device would operate in a default stand-by power mode until the predetermined moisture threshold was reached. Thereafter, the Bluetooth enabled device, such as wireless communication device 10, would preferably change from the default stand-by power mode to an active power mode where communications are functional and the device transmits a pre-defined message to a pre-defined destination. For example, upon detecting the moisture threshold, wireless communication 10 would preferably go from stand-by power mode to active power mode. The communication device would then preferably send a message to a predetermined destination, such as another communication device, indicating that the diaper needs changing. In this example, sensor 12 could also detect battery (not shown) power levels to trigger an output to the Bluetooth enabled device which would cause the Bluetooth enabled device to send a message to the other communication device indicating that the battery level is low, for example, and perhaps needs to be changed or charged. While this is one example of a condition which would trigger a power-up operation and the transmission of a predetermined message to a predetermined destination, it should be understood that any trigger could be used to perform such an operation.

Sensor 12 could be powered by any known power source (not shown), including for example, a small button cell. It should be understood that sensor 12 is not limited to taking only one type of measurement and may be a "smart" sensor, which is capable of multiple types of measurements, different trigger levels or methods and programmable measurement intervals, for example.

In addition, sensor 12 may be equipped or coupled to any type of communication device such that measurements or information from sensor 12 can be transmitted or output to the device for processing and use by the device or any other device within wireless network 2.

According to an embodiment of the present invention, sensor information gathered by sensor 12 and transmitted to wireless communication device 10, for example, may be shared with other devices, such as masters 3 and slaves 6 in wireless network 2. In addition, there may be multiple sensors which can communicate with masters 3 and slaves 6, regardless of whether the sensors are incorporated into any particular device. Thus, all devices within the network can share processed sensor information from sensor(s) 12. Optionally, the sensor information gathered from sensor 12 can be processed by controller 4 to optimize network operations, such as capacity and device allocation schemes. The sensed information can be made available to all devices through central controller 4. For example, if sensor 12 transmits measurements to a slave, and that slave processes the sensor information and determines from the processed sensor information that sensor is in a crowded area, this information could be transmitted to one or more masters, which could then adjust the network configuration and perhaps shift one or more slaves to a different master, i.e., readjust device allocation, which could, perhaps, be in a less crowded area. This improves the overall system capacity of wireless network 2.

If more than one sensor is coupled (not shown) through a wireless communication device, that device can use learning functions, through software which is known in the art, to determine a pattern match of usage. For example, the wireless communication device could learn that when certain sensor inputs are received, the user of the device is in a busy area, such as an airport, for example. Then, more power could be employed in the wireless communication device to overcome signal attenuation and fading due to the crowd. A service discovery protocol could be used to improve the sensor information and processing. Service discovery could be used, for example, to add more sensors either for the user's communication device or from any other user's communication device or to look for certain fixed position sensors information. For example, a wireless communication device could service discover a fixed device with sensors which can supplement ad hoc decision making for battery and capacity settings. In this case, the fixed device could act as the master.

Information processed by a wireless communication device from coupled sensors could be transmitted to central controller 4 in another embodiment of the present invention. Central controller 4 would then use the sensor information processed by the wireless communication device to draw a population distribution for the area covered by the wireless network 2. Bandwidth can thus be allocated amongst the master cells in accordance with this information. It is also possible that more than one wireless communication device from more than one master cell could transmit such sensor information to central controller 4 to determine population distribution within wireless network 2 to adjust system capacity and allocate bandwidth as appropriate.

In addition, coupled sensor information could be used to determine environment limitations, such as described above, and use master cell segmentation to improve the capacity of the network. In this embodiment, coupled sensor information which matched a usage pattern corresponding to a crowded area, for example, could be transmitted to the master. Then the master could segment some of the other slaves in that master cell to another master cell or create a new master cell to take on more slaves. This also improves the capacity of the wireless network.

Figure 3:
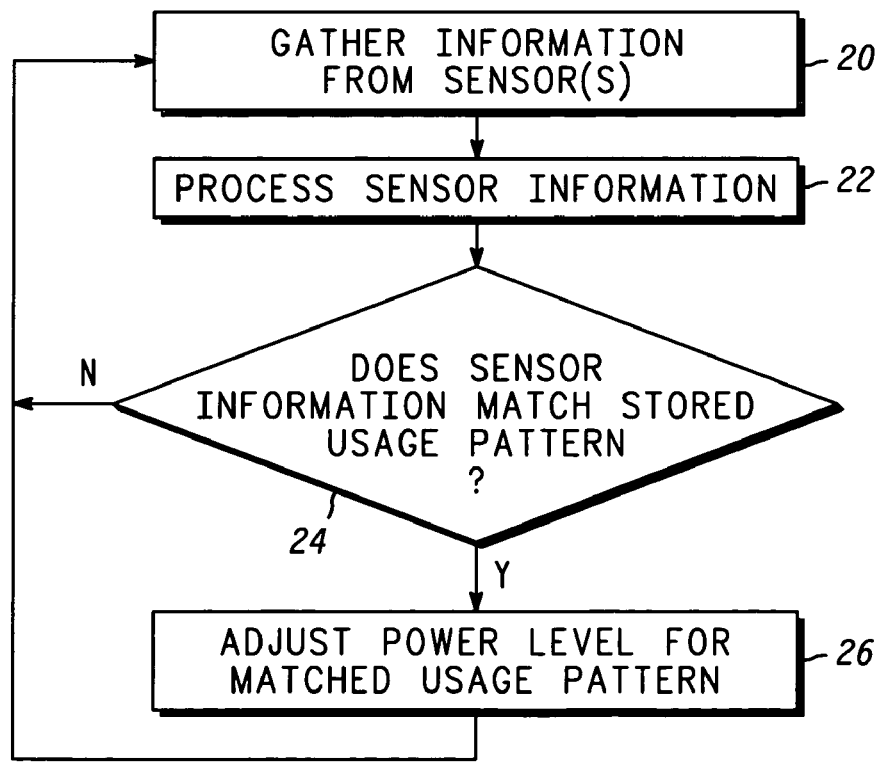
FIG. 3 is a flow chart showing a process by which power levels are adjusted in response to processed sensor information according to the present invention.

FIG. 3 is a flow chart showing a process by which power levels are adjusted in response to processed sensor information according to the present invention. Referring to FIG. 3, at operation 20 where information from at least one sensor, either incorporated into a communication device or provided separately or both, is gathered by the communication device. The information is then processed by the device in operation 22. As stated above, this processed sensor information can be shared with other communication devices, either fixed or mobile.

From operation 22, the process moves to operation 24, where the communication device, or any of the other devices with which the communication device shared the processed sensor information, determines whether the processed sensor information matches a stored usage pattern, for example, one which indicates that the sensor(s) is/are located in a crowded area.

If the processed sensor information does not match a stored usage pattern, the process moves from operation 24 to operation 20, where more information is gathered from the sensor(s) by the communication device.

However, if the processed sensor information does match a stored usage pattern, the process moves from operation 24 to operation 26, where the power level of the communication device, or any of the other devices within the wireless network, can be adjusted to compensate accordingly. It should be understood that if the communication device shares the processed sensor information with another device, either fixed or mobile, this processed sensor information could be used by the other device to create new information, perhaps corresponding to separately sensed conditions, which would be shared with the communication device and used to adjust certain parameters of the communication device, such as the power level, for example.

Figure 4:
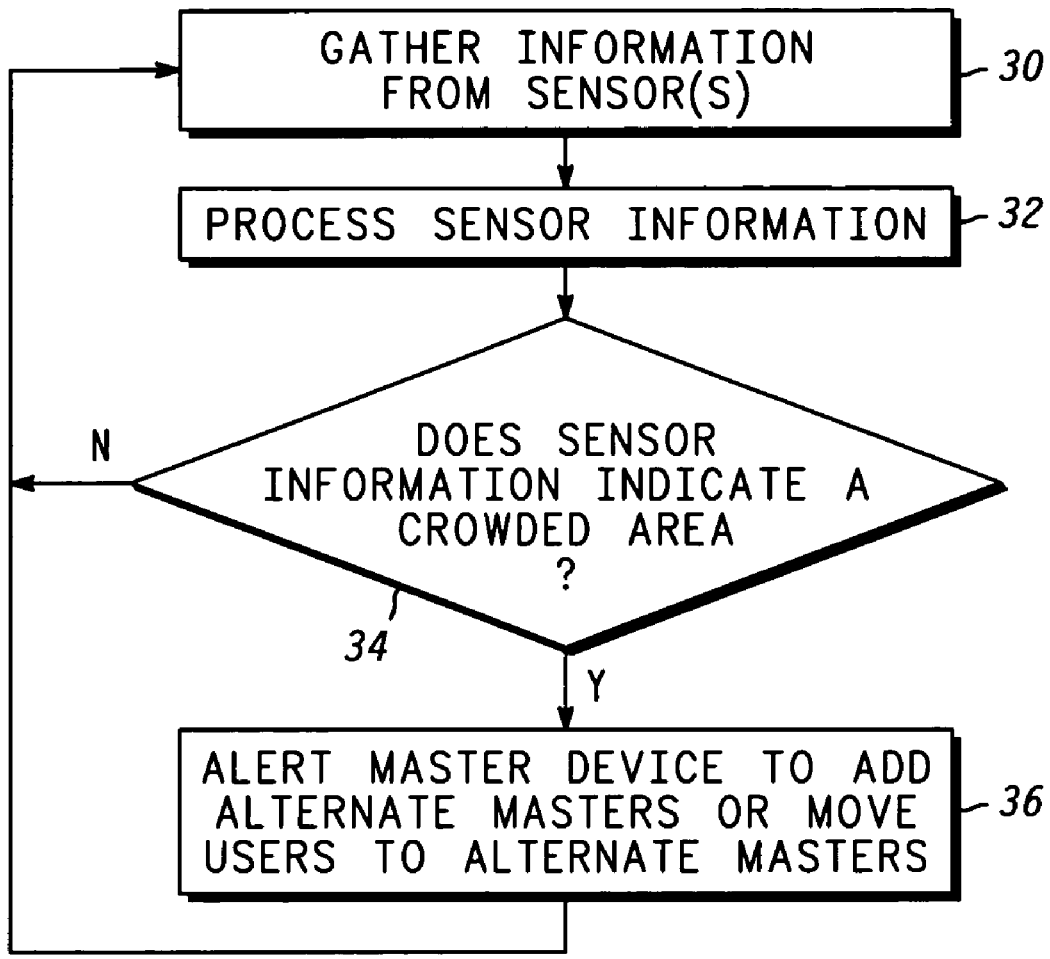
FIG. 4 is a flow chart showing a process by which capacity of the wireless network is improved according to the present invention.

FIG. 4 is a flow chart showing a process by which capacity of the wireless network is improved according to the present invention. Referring to FIG. 4, operations 30-32 correspond to operations 20-22 as described in conjunction with FIG. 3. Thus, an explanation of these operations will not be repeated.

From operation 32 the process moves to operation 34, where the communication device determines whether the sensor information indicates that the communication device, or the other devices sharing the sensor information, are located in a crowded area.

If the processed sensor information does not indicate a crowded area, the process moves to operation 30, where sensor information is gathered.

However, if the sensor information indicates a crowded area, the process moves to operation 36, where the communication device or devices which received or processed the sensor information preferably alert the master device that another master device needs to be added to the network or that certain users (communication devices) need to be moved to an alternate master, for example.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method of improving battery life of a wireless communication device, comprising:

sensing environmental conditions within a predetermined distance of the wireless communication device with a plurality of coupled sensors, each sensor of the plurality of sensors being selected from the group consisting of a crowd sensor, a range sensor, a moisture sensor and a sound sensor;

determining a usage pattern match based on the sensed environmental conditions; and adjusting a power consumption level of the wireless communication device in accordance with the usage pattern match, wherein the wireless communication device switches from a stand-by power mode to an active mode when the sensed environmental conditions satisfy a predetermined condition and automatically transmits a predetermined message to a predetermined device after the predetermined condition is satisfied.

* * * * *